United States Patent [19]
Bobo

[11] Patent Number: 5,207,511
[45] Date of Patent: May 4, 1993

[54] SQUEEZE FILM DAMPER OIL CONTROL

[75] Inventor: Melvin Bobo, Cincinnati, Ohio

[73] Assignee: General Electric Company, Cincinnati, Ohio

[21] Appl. No.: 733,897

[22] Filed: Jul. 22, 1991

[51] Int. Cl.$^5$ ............................................. F16C 27/00
[52] U.S. Cl. .................................. 384/99; 384/581
[58] Field of Search .............................. 384/99, 581

[56] References Cited

U.S. PATENT DOCUMENTS

| | | | |
|---|---|---|---|
| 3,158,413 | 11/1964 | Shelley | 308/35 |
| 3,652,139 | 3/1972 | Memery | 308/187 |
| 3,915,521 | 10/1975 | Young | 308/187 |
| 4,337,983 | 7/1982 | Hibner | 308/26 |
| 4,527,912 | 7/1985 | Klusman | 384/99 |
| 4,838,028 | 6/1989 | Witt | 384/99 X |
| 4,992,024 | 2/1991 | Heydrich | 415/229 |
| 5,048,978 | 9/1991 | Singh | 384/99 |
| 5,071,262 | 12/1991 | Monzel et al. | 384/99 |

FOREIGN PATENT DOCUMENTS 107114  8/1980  Japan ..................................... 384/99

OTHER PUBLICATIONS

Fluid Mechanics, Russell A. Dodge and Milton J. Thompson, McGraw-Hill Book Company, 1937, pp. 114 and 115.

Primary Examiner—Thomas R. Hannon
Attorney, Agent, or Firm—Jerome C. Squillaro; John R. Rafter

[57] ABSTRACT

A damper bearing assembly and method for damper oil conservation and recirculation. The assembly includes opposed channels enclosing a squeeze film space and open to direct flow from the damper squeeze film space. The channels can isolate the squeeze film space from leakage points in the assembly, and can be profiled to direct fluid exiting from the high pressure region away from leakage points. The channels isolate the low pressure region in the squeeze film from leakage points to prevent air entrainment.

10 Claims, 5 Drawing Sheets

SQUEEZE FILM DAMPER OIL CONTROL

BACKGROUND OF THE INVENTION

This invention relates to damper oil control and conservation in open-ended squeeze film shaft dampers which do not include piston ring seals or other end sealing means. More particularly, the invention relates to an internal damper oil reservoir which accommodates inherent fluid pumping conditions in a squeeze film damper to receive oil from, or discharge oil to, opposite ends of the damper squeeze film space when damper conditions warrant, with reduced leakage and air entrainment.

Squeeze film dampers are advantageously applied to high speed turbomachinery including gas turbine engines such as aircraft gas turbine engines in order to damp undesirable radial motion of the rotor shaft of such engines. A typical squeeze film shaft damper may comprise the combination of a rolling element bearing supporting a rotor shaft in which a bearing support member such as the annular outer race of the bearing is fitted in an annular chamber in the bearing supporting housing with permitted limited radial motion in the housing. A thin annular squeeze film space is defined between the outer circumference of the race and the bearing housing. Damper oil under pressure is introduced into the squeeze film space where radial motion of the race and its associated shaft decreases the thickness of the squeeze film and subjects the damper oil to very high pressure and viscous flow.

A rotor shaft imbalance may cause the shaft to undergo an eccentric or orbiting motion which is transmitted to the outer race in the bearing housing. Orbiting motion of the outer race provides an alternating decrease and increase in the squeeze film thickness which generates a high pressure fluid wave moving circumferentially in the annular squeeze film space, with resultant higher and lower pressure regions in the squeeze film space. Under these conditions damper fluid in the high pressure region may leak from the squeeze film through a clearance gap between the bearing support member and housing. On the other hand, the low pressure region in the squeeze film space may cause air to be drawn into the squeeze film through the same clearance gap, thereby diminishing damping effectiveness. A system of conserving and re-supplying existing and available damper oil would increase damper effectiveness.

It is therefore an object of this invention to provide improved internal oil control and oil conservation in a squeeze film damper.

It is another object of this invention to provide improved oil receiving and supplying reservoir channels open to direct flow from opposite ends of the annular squeeze film space of a squeeze film damper.

It is a further object of this invention to provide a squeeze film damper with circumferential oil reservoir channels concentrically adjacent with the squeeze film space of the damper and in open axial fluid flow communication therewith.

It is another object of this invention to isolate a high pressure region in the squeeze film from a clearance gap through which oil can escape.

It is another object of this invention to isolate a low pressure region in the squeeze film from a clearance gap through which air can be entrained in the squeeze film.

It is another object of this invention to direct oil exiting the high pressure region in a squeeze film space away from leakage points and direct the oil to re-supply a low pressure region of the squeeze film space.

SUMMARY OF THE INVENTION

A squeeze film damper comprises an annular bearing support member fitted in an annular chamber in a bearing housing and defining a thin oil filled annular squeeze film damper space therebetween. A circumferentially traveling pressure wave having high and low pressure regions is generated in the squeeze film space during orbiting motion of the bearing support member within the housing. At each end of the annular squeeze film space, a concentric circumferential reservoir channel is open to direct transverse or axial flow from the squeeze film space. The wall of each channel is profiled to isolate oil in the squeeze film space from a clearance gap between the bearing support member and the housing. Therefore, oil flowing from the high pressure region in the squeeze film pressure wave is more effectively captured in the channels for transport to the low pressure region of the squeeze film. Likewise, oil flowing from the channels into the low pressure region in the squeeze film pressure wave prevents entrainment of air from the clearance gap.

This invention will be better understood when taken in connection with the following specification and drawings.

DESCRIPTION OF THE PREFERRED EMBODIMENT

Figure 1:
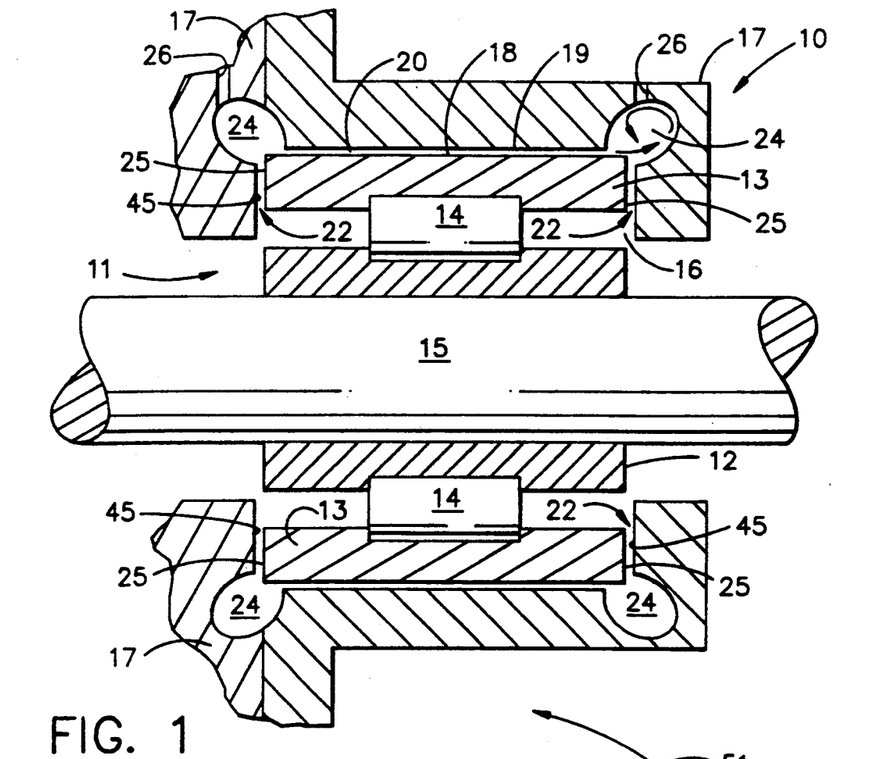
FIG. 1 is a schematic illustration of a partial cross-sectional view of a squeeze film damper embodying the improved oil receiving and supplying reservoir channels of this invention.

Referring to FIG. 1, a squeeze film damper assembly 10 comprises a rolling element bearing 11 having an inner race 12 and a bearing support member, such as spaced outer race 13, with rolling elements 14 therebetween. Inner race 12 is fitted on an axially extending shaft 15 to support shaft 15 and to rotate therewith on elements 14. Support member 13 fits in annular chamber 16 in bearing housing 17 for limited radial motion therein. An annular surface 18 of member 13 is closely adjacent a housing annular surface 19 to define an annular squeeze film damper space 20. Axial, or transverse clearance gaps 22 are provided between member 13 and housing 17 to permit radial motion of race 13 within housing 17.

Damper oil is introduced into damper space 20 from a supply (not shown) through one or more inlets 26. As previously noted, rotor shaft imbalance in high speed turbomachinery causes shaft 15 and member 13 to undergo some orbiting motion in annular chamber 16. The orbiting motion alternately decreases and increases the thickness of the oil film at a given circumferential location in damper space 20, corresponding to the eccentric orbiting motion. A circumferentially traveling pressure wave is thereby generated in the squeeze film space 20.

Figure 2:
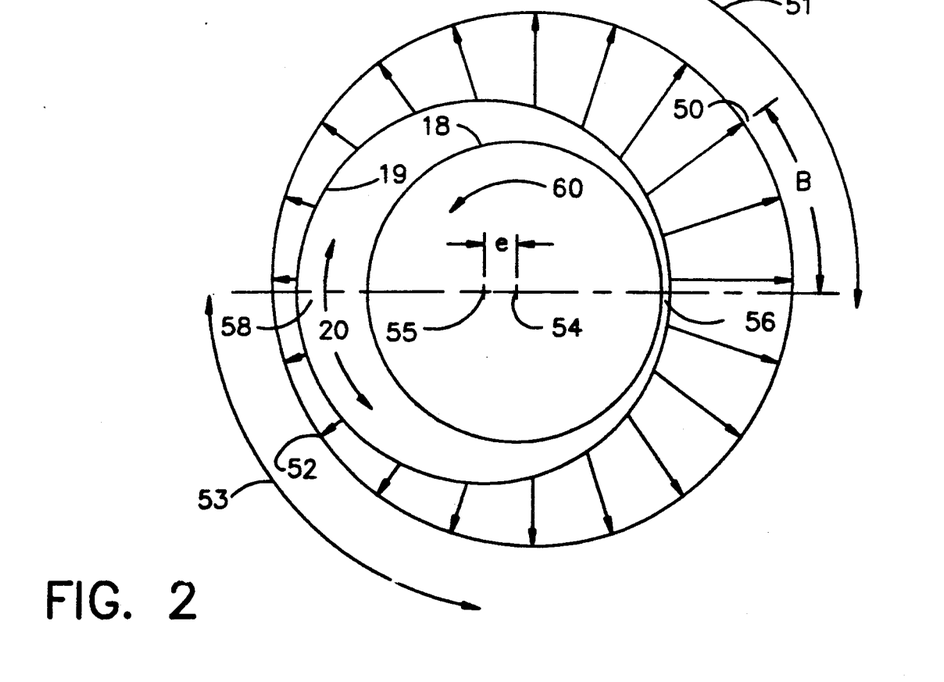
FIG. 2 is an illustration of a circumferentially traveling pressure wave generated in a squeeze film space.

Referring to FIG. 2, the hydrodynamics of the fluid in damper space 20 involves a number of factors such as the length and thickness of the film, as well as the viscosity of the fluid, shape of the orbit, and speed of the orbit. FIG. 2 shows the general nature of the fluid pressure circumferential pressure distribution in space 20 during counter clockwise (arrow 60) orbiting motion of shaft 15 and surface 18 within cylindrical surface 19.

The orbiting is characterized by an eccentricity e between a center 54 of shaft 15 and outer race surface 18, and center 55 of chamber surface 19. A high pressure region 51 and a low pressure region 53 are created in squeeze film 20 due to the orbiting motion of surface 18 with respect to surface 19. The maximum pressure location is indicated at 50, the minimum pressure location is indicated at 52, the minimum film thickness in space 20 is indicated at 56, and the maximum film thickness is indicated at 58.

The maximum pressure location 50 generally leads the point of minimum film thickness 56 by a phase angle, indicated as angle B in FIG. 2. The pressure wave shown in FIG. 2 travels circumferentially with the motion of the bearing outer race support member 13 within the housing 17.

Under these described conditions, damper oil is expelled laterally, or axially, from either side of space 20 at a high velocity at the high pressure side of the orbit. On the low pressure side of the orbit a supply of additional oil is desirable to minimize air entrainment into either end of space 20.

Figure 3A:
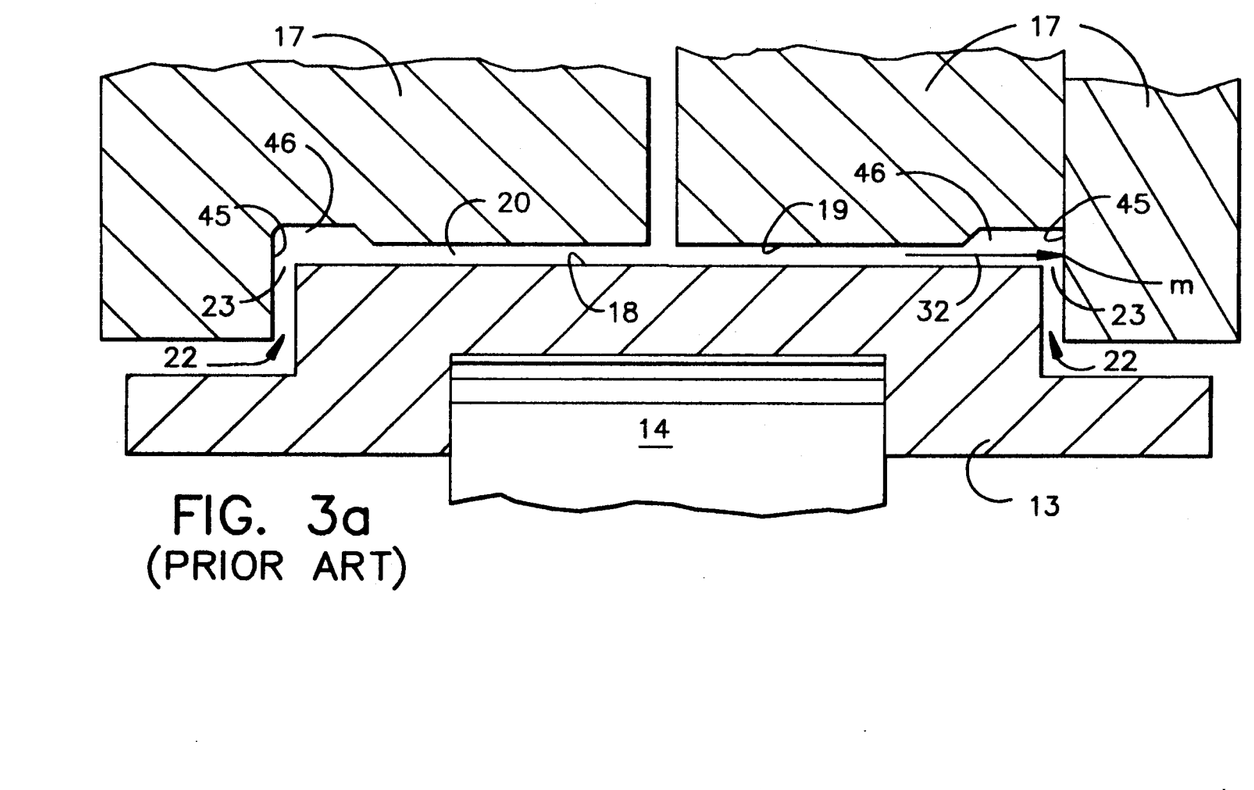
FIG. 3a is an illustration of a known squeeze film damper.

Referring to a known design shown in FIG. 3a, annular chambers 46 in the housing may be positioned adjacent each end of the squeeze film space 20 to extend circumferentially 360 degrees around the housing. Such chambers 46 are not open to direct axial flow from squeeze film space 20. Oil exiting space 20 must be turned, or redirected, through approximately ninety degrees at wall 45 to enter chambers 46. In addition, oil can flow from damper space 20 into an associated clearance gap 22 without entering chamber 46.

Applicant has recognized that such known chambers include disadvantageous. For instance, as outer race surface 18 moves toward housing surface 19, damper oil in the high pressure region is expelled axially from space 20 as a high velocity jet 32. As indicated by arrow 32, the jet impacts at a stagnation point m on a vertical wall 45 of housing 17. Point m is a stagnation point because the axial velocity of jet 32 is reduced to zero on striking a wall 45 which is essentially perpendicular to the flow 32. Nearly the entire velocity head (or dynamic pressure) representing the kinetic energy of oil jet 32 is converted to a high static pressure at stagnation point m, as is understood by those skilled in the art of fluid sciences.

Since stagnation point m is both radially and axially closely adjacent to the mouth 23 of clearance gap 22, the high static pressure generated at m will result in fluid being pumped into clearance gap 22. Fluid pumped into clearance gap 22 is not available to provide damping or for re-supply to the squeeze film, and must be replaced.

Figure 3B:
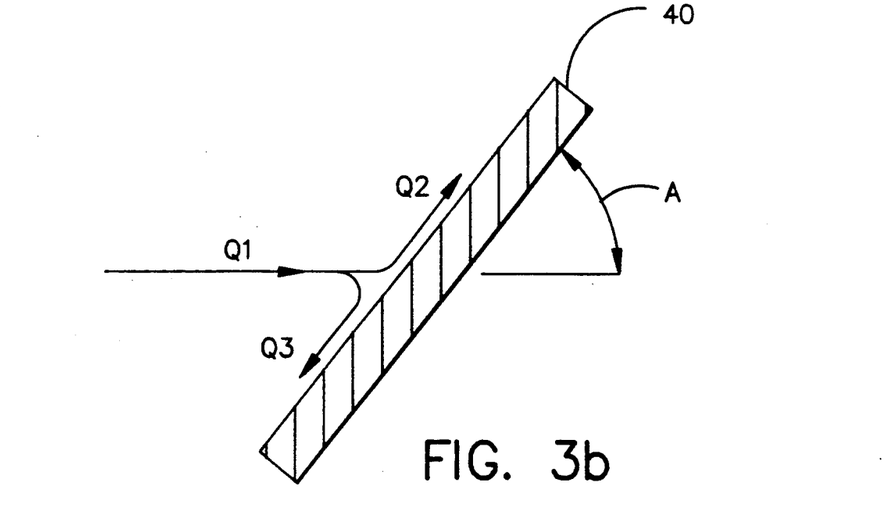
FIG. 3b is an illustration of a jet splitting into two streams upon impinging on a surface.

The vertical wall 45 of the housing will also act to split the flow of oil jet 32. Referring to FIG. 3b, a jet having flow Q1 and impacting on an oblique surface 40 inclined at an angle A will split into two flows Q2 and Q3, where Q1, Q2, and Q3 represent volumetric flow rates. The flow rates will be proportioned according to the following equations (See Fluid Mechanics, by Dodge and Thompson, First Edition, McGraw-Hill, page 115, 1937):

$$Q2 = (Q1/2) \times (1 + \text{Cosine}(A))$$

$$Q3 = (Q1/2) \times (1 - \text{Cosine}(A))$$

Thus, where the oil jetting from space 20 impacts against a vertical housing wall (with angle A of approximately 90 degrees), a high percentage (approximately fifty percent) of the flow in the oil jet will be directed into clearance gap 22 due to the geometry of the housing wall.

In addition, in the low pressure region of the pressure wave in space 20 it is possible that the pressure in space 20 may be lower than the pressure in clearance gap 22. Thus, air may be drawn into space 20 where the mouth 23 of gap 22 is both radially and axially adjacent to the squeeze film space 20.

Figure 3C:
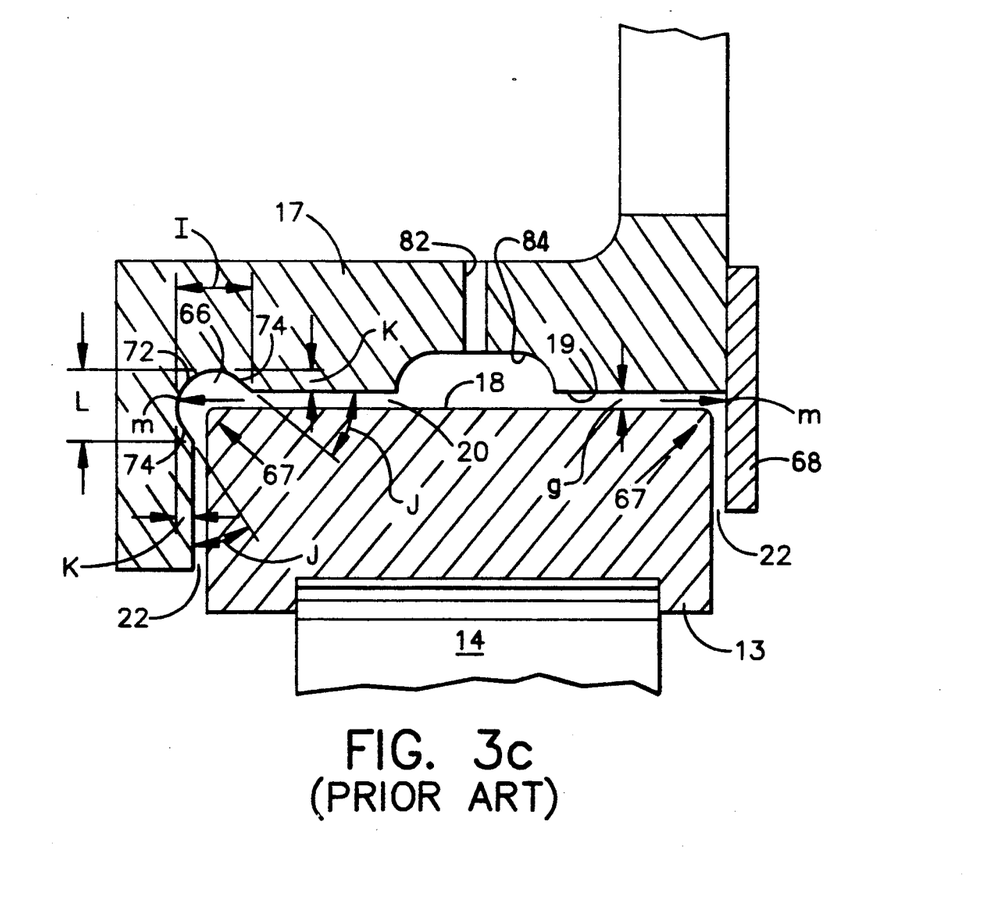
FIG. 3c is an illustration of a known squeeze film damper.

FIG. 3c shows a known damper design having an outer race 13 secured in a housing 17 by a snap ring 68. Oil introduced through a passage 82 enters circumferentially extending channel 84 to supply squeeze film space 20. Space 20 has a nominal cross-sectional area defined by the axial length of space 20 and the nominal squeeze film thickness g when race 13 is centered in housing 17. The housing can include a circumferentially extending machined relief groove 66 adjacent one end of squeeze film space 20. Machined relieve groove 66 is included in housing 17 to permit insertion of race 13 in housing 17, and is sized to prevent interference between the race and housing in the corner region indicated as 67 in FIG. 3c.

Groove 66 can include a radiused surface 72 having a radius of curvature of about 0.030 inch to 0.040 inch. Groove 66 can also include straight surfaces 74 inclined at angles J between 30 degrees and 50 degrees. The radial and lateral depth, K, of groove 66 can be between 0.002 inch and 0.020 inch. Dimensions I and L can be up to 0.105 inch and 0.07 inch, respectively. The length of the squeeze film space 20 is approximately 0.51 inches, with a nominal (nominal meaning when race 13 is centered in housing 17) squeeze film thickness g of about 0.00225 inches.

Flat ring 68 is substantially perpendicular to oil jetting from one end of space 20. Likewise, oil jetting from the other end of space 20 impinges on radiused surface 72 at point m, and may be directed toward gap 22 rather than away from gap 22. Neither of the surfaces 74 of FIG. 3c extend both radially inward and radially outward of squeeze film space 20. Therefore, at each end of squeeze film space 20 in FIG. 3c, a high percentage of the oil jetting from space 20 can be directed into clearance gaps 22 based on the equations above.

In addition, the cross-sectional area of groove 66 is relatively small. Based on the maximum dimensions of groove 66 listed above, the maximum cross-sectional area of groove 66 is less than twice (approximately 1.4 times) the nominal cross-sectional area of squeeze film space 20. The average, or nominal cross-sectional area of groove 66 is about 0.8 times the nominal cross-sectional area of squeeze film space 20.

Figure 4:
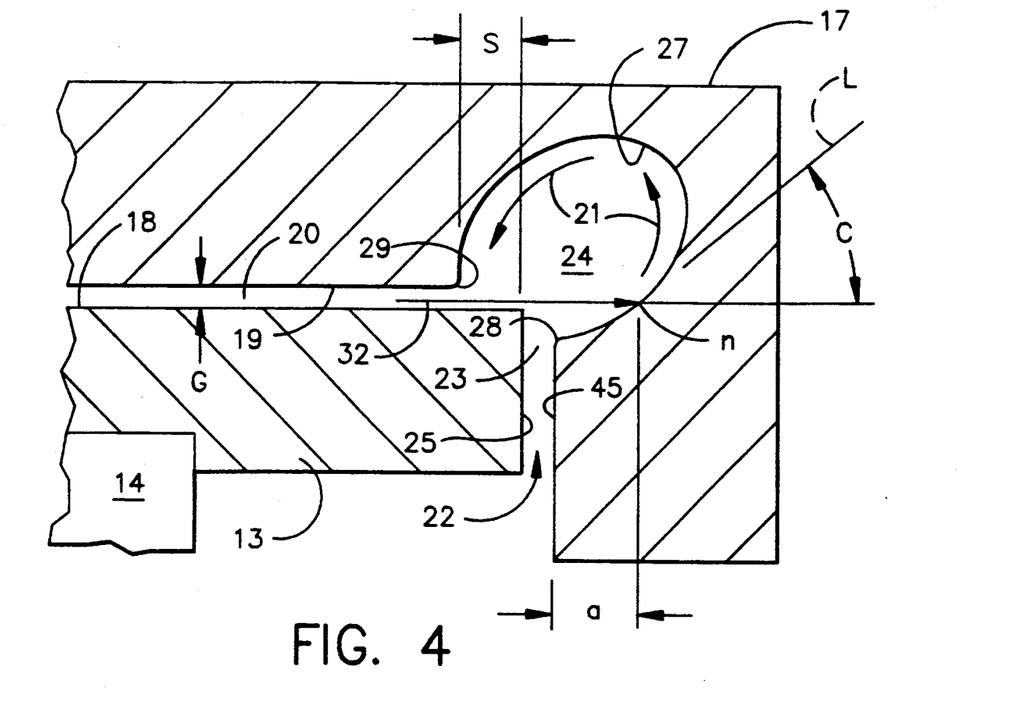
FIG. 4 is an enlarged illustration of one of the improved oil receiving and supplying reservoir channels of this invention shown in FIG. 1, illustrating benefits of the channels in the high pressure region of the squeeze film space.
Figure 5:
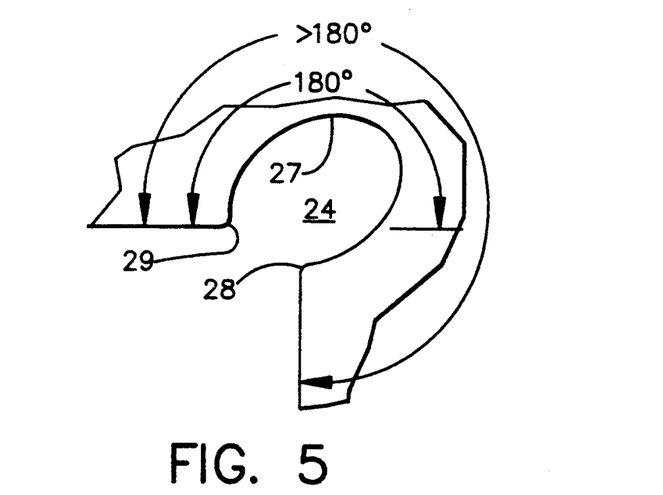
FIG. 5 is an illustration of the profile of the reservoir channel surface in FIG. 4 showing the angular travel of fluid following the surface profile.
Figure 6:
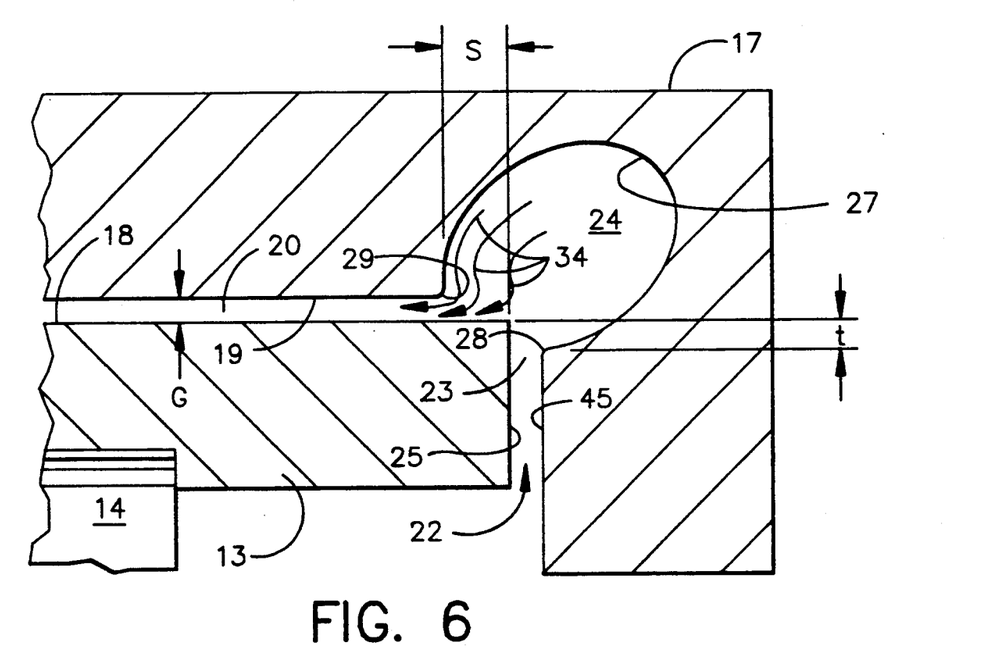
FIG. 6 is an enlarged illustration of one of the improved oil receiving and supplying reservoir channels of this invention shown in FIG. 1, illustrating benefits of the cavity in the low pressure region of the squeeze film pressure wave.

Referring to FIGS. 4, 5, and 6, applicant believes the disadvantages of the known damper bearing designs can be reduced or eliminated by means of the pair of particularly shaped and positioned annular channels 24 of the present invention. A pair of opposed circumferentially extending channels 24 enclose the squeeze film space 20 and are open to direct flow from the squeeze film space. FIGS. 4 and 6 show one of the preferred annular channels 24 which is open to direct flow from damper space 20. That is, the channels 24 are positioned and shaped (or profiled) such that flow exiting space 20 can enter each channel 24 without first being redirected. Channels 24 are circumferentially continuous, extending through 360 degrees in housing 17.

FIGS. 4 and 6 illustrate the flow of the damper fluid entering and leaving channel 24 in the high and low pressure regions of damper space 20, respectively. Dimensions in FIGS. 4 and 6 are not drawn to scale, but are drawn to represent the nominal or average dimensions when race 13 is positioned concentrically within chamber 16. For example, dimensions G and t represent nominal radial dimensions, and the actual radial dimensions at any point around the circumference of the bearing will vary with motion of race 13 within chamber 16.

In the high pressure zone the damper oil will be expelled from space 20 into the channels 24, while on the low pressure side the oil will be drawn into film space 20 from channels 24. Channel 24 can be in a series flow relationship with damper space 20 and an associated clearance gap 22, so that fluid in space 20 cannot enter gap 22 without first entering channel 24. In contrast, the known chamber 46 and its associated gap 22 in FIG. 3a are in parallel flow communication with space 20, so that fluid can flow between space 20 and gap 22 without entering channel 46.

Channels 24 should be sized to serve as a reservoir and transport passage from the high pressure region in the squeeze film space to the low pressure region, with a circumferential pressure drop which is small compared to the pressure drop between the high and low pressure regions in the squeeze film space 20. To this end, the cross-sectional area of channels 24 should be large compared to the cross-sectional area of the squeeze film. Each channel 24 may be sized to have a nominal cross-sectional area that is at least twice, and preferably more than four times the cross-sectional area of the squeeze film space 20 (where the cross-sectional area of the squeeze film space is the length of the film times the nominal thickness G of space 20).

Clearance gaps 22 should be sized for the minimal clearance between member 13 and housing 17 which permits radial motion of member 13 in housing 17.

Referring to FIG. 4, each channel 24 includes a circumferentially continuous surface 27 shown in profile. The profile of surface 27 is preferably curvilinear, that is, composed of a combination of smoothly blended straight and curved portions, and may be generally oval in shape. The profile of surface 27 can turn fluid through more than 180 degrees, as shown in FIG. 5. The profile of surface 27 can extend from a first end at a first circumferentially continuous edge 28, to a second end at a second circumferentially continuous edge 29. Thus, fluid following surface 27 from 28 to 29 would be turned approximately 270 degrees. The end at 29 may be formed in housing surface 19, and the end at 28 may be formed in housing sidewall 45.

At any circumferential location during bearing operation, each channel 24 overlaps a portion of annular surface 18 and also overlaps a portion of sidewall 25. Thus, channels 24 can extend radially inward and outward, as well as axially inboard and outboard, from the edge of member 13 where surface 18 and sidewall 25 intersect.

Channels 24 can be open to both radial and axial flow, and includes a portion adjacent first edge 28 which is radially inward of support member annular surface 18 and axially outboard of housing sidewall 45. Channels 24 can also include a portion adjacent second edge 29 which is axially inboard of support member sidewall 25 and radially outward of housing annular surface 19. Thus, channels 24 can include portions both axially inboard and axially outboard of an associated clearance gap 22.

Channels 24 includes a number of features which isolate the jet 32 exiting the high pressure region of the squeeze film from the mouth 23 of clearance gap 22. First, damper space 20 is isolated from mouth 23 of clearance gap 22 by a radial offset represented by t in FIG. 6. The first end of surface 27 at edge 28 is positioned radially on housing sidewall 45 such that when member 13 is positioned concentrically within annular chamber 16, the first end of surface 27 is spaced radially inwardly of surface 18 by offset t. Thus, part of member 13 acts as a radial shoulder having a height represented by t, and radially separates mouth 23 of gap 24 from damper space 20.

In a preferred embodiment t is at least three times the radial height G of the damper space when the member 13 is positioned concentrically within annular chamber 16. It is to be understood that the radial heights represented by G and t will vary as member 13 orbits in chamber 16, and that t should be sized so that the radial offset which it represents will be greater than zero for all motion of member 13 within chamber 16.

A second isolation feature of each channel 24 comprises an inclined surface portion at impingement point n where jet 32 impinges on surface 27. As shown in FIG. 4, imaginary line L is tangent to surface 27 at n, so that each surface 27 includes a surface portion at n inclined with respect to jet 32 by an angle C. The inclined surface portions extend radially inward and outward of surface 19 and squeeze film space 20, are preferably circumferentially continuous, and direct jets 32 away from gaps 22 at each end of the space 20.

Angle C is preferably between about 30 degrees and 60 degrees. The portion of surface 27 which is inclined to jet 32 helps to direct more damper fluid radially outward and axially outboard in each channel 24 and away from clearance gaps 22, as can be understood by reference to the aforementioned equations.

In addition, the inclined portion of surface 27 permits jet 32 to retain an axial component of velocity after impinging at point n. Thus, less of jet 32's kinetic energy will be converted to static pressure, and the static pressure developed at point n will be lower than the static pressure at stagnation point m in FIG. 3a and FIG. 3c.

Referring to FIGS. 4 and 6, a third feature of channel 24 includes axial isolation of damper space 20 from clearance gap 22. Offset s axially separates the squeeze film space 20 from gap 22, where s is the axial distance from second end 29 of the profile to sidewall 25. Offset s is preferably at least three times the nominal radial height G of damper space 20.

A fourth isolation feature of channel 24 includes axial and radial isolation of point n from clearance gap 22. As shown in FIG. 4, jet 32 crosses over gap 22 to impinge at point n, where a portion of the velocity head of jet 32 is converted to a static pressure. The profile of each channel 24 axially spaces point n from an associated gap 22 by an axial offset a, and radially spaces point n from gap 22 by the offset represented by t. Thus, the static pressure developed at point n is remote from gap 22, and will have less tendency to pressurize damper fluid into gap 22.

Referring to FIG. 6, channel 24 also provide an advantage in the low pressure region of the damper space 20. As indicated by arrows 34, channels 24 serves as reservoirs to supply oil flow to the low pressure region in space 20. The axial offset s and the radial offset represented by t also isolate the low pressure region in space 20 from gap 22. Therefore, the low pressure region of space 20 will be replenished with oil from channels 24 rather than with air from clearance gaps 22.

The generally oval profile of surface 27 directs oil in a flow pattern indicated by the swirling arrows 21 in FIG. 4, and promotes a swirling flow at each circumferential location. The swirling flow, in turn, helps to initiate a helical flow pattern in channel 24. Flow in channel 24 will simultaneously be directed circumferentially in channels 24 due to the pressure difference between the high and low pressure regions in the damper space 20. The helical flow pattern includes the swirling flow at each circumferential location, coupled with the circumferential flow in channel 24 from the high pressure region to the low pressure region in the squeeze film pressure wave. To the extent that the swirling flow represented by arrows 21 persists around the channel 24, the flow will terminate on race surface 18 due to offset s, rather than being directed radially into clearance gap 22.

Referring to FIG. 1, oil supply to the damper is preferably provided directly to one or both of the channels 24, as through inlets 26. Each channel 24 may include one or more inlets 26 spaced around the circumference of housing 17. Damper fluid could be supplied directly to space 20. However, circumferential pressure variations in space 20 will be much greater than those in channels 24, since the percentage volume change of channels 24 will be much smaller than the percentage volume change of space 20 during motion of member 13 within chamber 16. Further, an oil supply ported directly to space 20 may require check valve means to prevent back flow. Supplying oil channels 24 rather than directly to the squeeze film space 20 will eliminate the need for such check valve means.

The channels 24 work together to provide an improved method of damper fluid conservation and resupply to the squeeze film space 20. The opposed channels enclose space 20 so that oil jetting from either end of the high pressure region of damper space 20 is flowed over clearance gaps 22 to directly enter channels 24 for channeling to a low pressure region in damper space 20. The fluid jet can be flowed over an inclined surface portion spaced from a leakage point at an associated clearance gap 22, in order to isolate and direct the fluid from the leakage point. The channel surface can be profiled to swirl the fluid flow as it is channeled to the low pressure region in space 20, and to isolate the squeeze film space from the leakage point.

While this invention has been described with respect to a preferred embodiment, it will be understood by those skilled in the art that various changes and modifications may be made without departing from the spirit and scope of the invention as set forth in the following claims:

I claim:

1. A damper bearing assembly for use in a gas turbine engine, the bearing assembly comprising:
   (a) a bearing support member disposed for rotation in a housing, the support member and housing defining a fluid annular squeeze film space there between;
   (b) the squeeze film space enclosed by a pair of opposed, circumferentially extending channels disposed in the housing, each channel open to direct flow from the annular squeeze film space;
   (c) each channel in flow communication with an associated clearance gap formed between a support member sidewall and a housing sidewall, and wherein each channel radially and axially spaces the squeeze film space from the channel's associated clearance gap;
   (d) each channel including a circumferentially extending surface portion which is inclined with respect to flow exiting the squeeze film space to direct flow away from the channel's associated clearance gap.

2. The assembly recited in claim 1, wherein each channel has a nominal cross-sectional area at least two times the cross-sectional area of the squeeze film.

3. The assembly recited in claim 1, wherein the surface portion is inclined between thirty and sixty degrees with respect to flow from the squeeze film.

4. The assembly recited in claim 1, wherein the inclined surface portion is spaced radially and axially from the channel's associated clearance gap.

5. The assembly recited in claim 1, wherein each channel has a curvilinear profile extending through more than 180 degrees.

6. The assembly recited in claim 1, wherein each channel includes a plurality of oil supply inlets spaced around the circumference of the housing.

7. In a damper bearing assembly including a bearing support member disposed in a housing to define a fluid filled annular squeeze film space, a method of recirculating damper fluid comprising the steps of:
   (a) flowing fluid from a high pressure region in the squeeze film space directly into a pair of circumferentially extending channels enclosing the squeeze film space;
   (b) channeling the fluid to a low pressure region in the squeeze film space; and
   (c) impinging the fluid on an inclined channel surface portion in each channel to direct the fluid into the channels.

8. The assembly recited in claim 7, further including the step of spacing the inclined surface portions and the squeeze film space axially and radially from leakage points.

9. The method of claim 7, further including the step of swirling the fluid as it is channeled to the low pressure region.

10. A damper bearing assembly for use in a gas turbine engine, the bearing assembly comprising:

(a) a bearing outer race disposed for rotation in bearing housing, the outer race including a race annular surface separating spaced-apart race sidewalls, the housing including a housing annular surface facing the race annular surface and a pair of spaced-apart housing sidewalls, each housing sidewall facing an adjacent race sidewall;

(b) an annular squeeze film space defined between the race and housing annular surfaces;

(c) a pair of clearance gaps defined between adjacent race and housing sidewalls; and (d) a pair of circumferentially extending channels disposed in the housing and enclosing the squeeze film space, each channel having a nominal cross-sectional area at least twice the cross-sectional area of the squeeze film space, each channel directly open to flow from the annular squeeze film space, and each channel having a surface portion spaced axially and radially from an associated clearance gap and inclined between 30 and 60 degrees with respect to flow entering the channel and impinging on the inclined surface portion, the surface portion inclined to direct flow entering the channel away from a clearance gap associated with the channel.

* * * * *